United States Patent
Nakajima

[11] Patent Number: 6,022,155
[45] Date of Patent: Feb. 8, 2000

[54] DRIVER IC AND PRINT HEAD

[75] Inventor: Norio Nakajima, Tokyo, Japan

[73] Assignee: Oki Data Corporation, Tokyo, Japan

[21] Appl. No.: 09/025,332

[22] Filed: Feb. 18, 1998

[30] Foreign Application Priority Data

Feb. 27, 1997 [JP] Japan .................................. 9-044095

[51] Int. Cl.[7] .................................................. B41J 2/00
[52] U.S. Cl. .......................................................... 400/118.2
[58] Field of Search .......................... 400/118.2, 120.01; 346/107

[56] References Cited

U.S. PATENT DOCUMENTS

| | | | |
|---|---|---|---|
| 4,998,119 | 3/1991 | Collins et al. | 346/107 |
| 5,200,763 | 4/1993 | Tanuma et al. | 346/107 |
| 5,371,525 | 12/1994 | Murano | 346/107 |
| 5,467,036 | 11/1995 | Sawada | 327/108 |
| 5,734,406 | 3/1998 | Nakamura et al. | 347/132 |

*Primary Examiner*—Ren Yan
*Assistant Examiner*—Charles H. Nolan, Jr.
*Attorney, Agent, or Firm*—Akin, Gump, Strauss, Hauer & Feld, L.L.P.

[57] ABSTRACT

A driver IC has a shift register and latch circuit as a data holding circuit for holding drive data for plural LED elements, and AND elements as driving elements for outputting drive signals based on the drive data held in the latch circuit. The AND elements are divided into AND element groups, each of which includes a predetermined number of AND elements. The driver IC also has strobe lines for transmitting strobe signals to the AND elements. The strobe signals are used for transmitting to the AND elements information regarding driving order of the AND elements in each of the AND element groups. The driver IC also has common output terminals each formed by connecting output terminals of the AND elements in each of the AND element groups.

7 Claims, 7 Drawing Sheets

DRIVER IC AND PRINT HEAD

BACKGROUND OF THE INVENTION

The present invention relates to a driver IC and an LED (light emitting diode) print head which can be incorporated into an electrophotographic printer, a copying machine, a facsimile machine and the like. The LED print head hereinafter also means a device which includes a light emitting transistor and a liquid crystal shutter.

FIG. 1 is a circuit diagram showing a conventional LED print head, and FIG. 2 is a timing chart showing signals inputted to the LED print head of FIG. 1.

As shown in FIGS. 1 and 2, in the LED print head 1, drive data $DATA_1$ for one line of LED elements 7 are transmitted to a shift register 3 of a driver IC 2 (between a time $t_1$ and a time $t_2$) in synchronization with a clock signal CLK, and subsequently transmitted to a latch circuit 4 (at a time $t_3$) in synchronization with a load signal $LD_1$. Drive signals based on the drive data $DATA_1$ are then transmitted to the LED elements 7 of an LED array 6 (at a time $t_5$) through AND elements 5 and wires 8, respectively, so that one line of LED elements 7 are simultaneously operated. Such a driving system is called a static system.

However, in the above-described LED print head 1, the LED elements 7 are connected to the AND elements 5 by the wires 8, respectively. Therefore, a large number of wires 8 are needed (for example, 4992 wires are needed in the case of an LED print head for forming an image with a dot density of 600 [DPI] on a sheet of A4-size paper) and a density of the wires 8 is increased, so manufacturing costs of the LED print head 1 are raised.

Further, FIG. 3 is a circuit diagram showing another conventional LED print head, and FIG. 4 is a timing chart showing signals inputted to the LED print head of FIG. 3.

As shown in FIGS. 3 and 4, in the LED print head 11, drive data $DATA_2$ for ½ line of LED element groups 17 ("odd-numbered LED elements 17a") are transmitted to a shift register 13 of a driver IC 12 (between a time $t_{11}$ and a time $t_{12}$) in synchronization with a clock signal $CLK_2$, and subsequently transmitted to a latch circuit 14 (at a time $t_{13}$) in synchronization with a load signal $LD_2$. Drive signals based on the drive data $DATA_2$ are then transmitted to the LED elements 17a of an LED array 16 (at a time $t_{15}$) through AND elements 15 and wires 18, respectively. Since only LED grounds in the odd-numbered LED elements 17a are grounded through the ground line 10a (at a time $t_{14}$), i.e., only the odd-numbered LED elements 17a are in a light emission enabling state, light is emitted from only the odd-numbered LED elements 17a. Next, drive data $DATA_2$ for ½ line of LED element groups 17 ("even-numbered LED elements 17b") are transmitted to the shift register 13 (between a time $t_{16}$ and a time $t_{17}$) in synchronization with the clock signal $CLK_2$, and subsequently transmitted to the latch circuit 14 (at a time $t_{18}$) in synchronization with the load signal $LD_2$. Drive signals based on the drive data $DATA_2$ are then transmitted to the LED elements 17b of the LED array 16 (at a time $t_{20}$) through the AND elements 15 and the wires 18, respectively. Since only LED grounds in the even-numbered LED elements 17b are grounded through the ground line 10b (at a time $t_{19}$), i.e., only the even-numbered LED elements 17b are in a light emission enabling state, light is emitted from only the even-numbered LED elements 17b. In the LED print head 11, the odd-numbered LED elements 17a and the even-numbered LED elements 17b are driven alternately. Such a driving system is called a dynamic system.

In the LED print head 11, couples of two adjacent LED elements 17a, 17b are connected to the AND elements 15 by the wires 18, respectively. Therefore, a number of the wires 18 can be reduced by half in comparison with the LED print head 1 as the static system shown in FIG. 1.

However, in comparison with the LED print head 1 of FIG. 1 and the LED print head 11 of FIG. 3, the drive data $DATA_1$ and $DATA_2$, the load signals $LD_1$ and $LD_2$, etc. are different from each other. Therefore, the LED print head shown in FIG. 3 having a small number of wires between the LED array and the driver IC cannot be incorporated into an LED printer adopting a data transfer system (data transfer system using the drive data $DATA_1$ and the load signal $LD_1$) shown in FIG. 2.

SUMMARY OF THE INVENTION

An object of the present invention is therefore to provide a driver IC and an LED print head which are applicable to a driving system for holding drive data for one line of LED elements in block and able to reduce a number of wires for connecting an LED array and the driver IC.

According to one aspect of the present invention, a driver IC comprises a data holding circuit for holding drive data for plural printing elements; driving elements for outputting drive signals based on the drive data held in the data holding circuit, the driving elements being divided into driving element groups, each of which includes a predetermined number of driving elements; strobe lines for transmitting strobe signals to the driving elements, the strobe signals being used for transmitting to the driving elements information regarding driving order of the driving elements in each of the driving element groups; and common output terminals each formed by connecting output terminals of the driving elements in each of the driving element groups.

In this driver IC, the printing elements are, for example, LED elements. Further, the predetermined number of driving elements are, for example, two driving elements.

According to another aspect of the present invention, an LED print head comprises LED elements linearly arranged, the LED elements being divided into LED element groups, each of which includes a predetermined number of LED elements adjacent to each other; light emission enabling lines used for selecting the LED elements to set light emitting order of the LED elements in each of the LED element groups; common input terminals each formed by connecting input terminals of the LED elements in each of the LED element groups; a data holding circuit for holding drive data for the LED elements; driving elements for outputting a drive signal based on the drive data held in the data holding circuit, the driving elements being divided into driving element groups, each of which includes a predetermined number of driving elements; strobe lines for transmitting strobe signals to the driving elements, the strobe signals being used for transmitting to the driving elements information regarding driving order of the driving elements in each of the driving element groups; common output terminals each formed by connecting output terminals of the driving elements in each of the driving element groups, the common output terminals corresponding to the common input terminals, respectively; and wires for connecting the common input terminals and the common output terminals, respectively.

In this LED print head, the predetermined number of LED elements are, for example, two LED elements, and the predetermined number of driving elements are, for example, two driving elements.

BRIEF DESCRIPTION OF THE DRAWINGS

The present invention will become more fully understood from the detailed description given hereinbelow and the accompanying drawings which are given by way of illustration only, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

Figure 5:
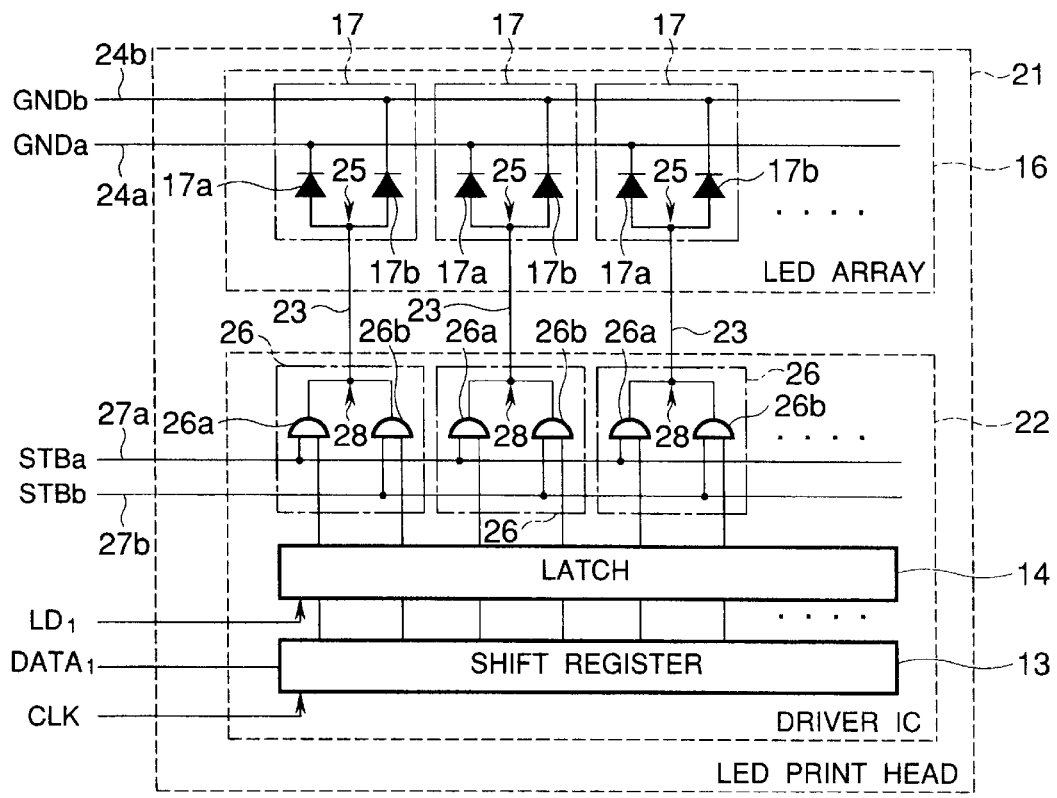
FIG. 5 is a circuit diagram showing an LED print head according to an embodiment of the present invention.

FIG. 5 is a circuit diagram showing an LED print head according to an embodiment of the present invention.

As shown in FIG. 5, the LED print head 21 according to this embodiment includes an LED array 16, a driver IC 22 for driving the LED array 16, and plural wires 23 for transmitting driving signals from the driver IC 22 to the LED array 16.

The LED array 16 has plural LED elements 17a, 17b (The LED elements 17a are referred to as "odd-numbered LED elements", while the LED elements 17b are referred to as "even-numbered LED elements") linearly arranged. The odd-numbered LED elements 17a and the even-numbered LED elements 17b are arranged in a line direction perpendicular to a conveying direction of printing paper (not shown in the figures). An arranging density of the LED elements 17a, 17b is set to, for example, 600 [DPI]. The LED elements 17a, 17b are divided into plural LED element groups 17, each of which includes a couple of LED elements 17a, 17b adjacent to each other.

The LED array 16 also has ground lines 24a, 24b connected to the LED elements 17a, 17b, respectively. Cathode sides (i.e., ground sides) of the odd-numbered LED elements 17a are connected to the LED ground line 24a while cathode sides (i.e., ground sides) of the even-numbered LED elements 17b are connected to the LED ground line 24b. The ground lines 24a, 24b are used for selecting either the LED elements 17a or 17b (i.e., for setting light emitting order of the LED elements 17a, 17b in each of the LED element groups 17). In this embodiment, the odd-numbered LED elements 17a and the even-numbered LED elements are driven alternately.

The LED array 16 also has common input terminals 25 each formed by connecting input terminals (anode sides, i.e., power source sides) of the couple of LED elements 17a, 17b in each of the LED element groups 17.

Further, the driver IC 22 has a shift register 13 which receives drive data $DATA_1$ for one line of LED elements 17a, 17b in synchronization with a clock signal CLK and holds the drive data $DATA_1$, and a latch circuit 14 which latches the drive data $DATA_1$ held in the shift register 13 in synchronization with a load signal $LD_1$.

The driver IC 22 also has plural AND elements 26a, 26b (a number of which is equal to a number of the LED elements 17a, 17b) which output drive signals based on the drive data $DATA_1$ held in the shift register 13 and latched in the latch circuit 14. It should be noted that the AND elements 26a, 26b may be replaced by other logic elements such as NAND elements which can output drive signals based on the drive data $DATA_1$ in accordance with the strobe signals STBa, STBb. The driver IC 22 also has strobe lines 27a, 27b for transmitting strobe signals STBa, STBb to the AND elements 26a, 26b, respectively. The AND elements 26a, 26b are divided into plural AND element groups 26 each formed by a couple of AND elements 26a, 26b adjacent to each other. The strobe signals STBa, STBb are used for transmitting to the AND elements 26a26b information regarding driving order of the AND elements 26a26b in each of the AND element groups 26. In this embodiment, the odd-numbered AND elements 26a and the even-numbered AND elements 26b are driven alternately. One input terminal of each of the AND elements 26a is connected to the strobe line 27a and the other input terminal is connected to the latch circuit 14. Further, one input terminal of each of the AND elements 26b is connected to the strobe line 27b and the other input terminal is connected to the latch circuit 14.

The driver IC 22 also has common output terminals 28 each formed by connecting a couple of output terminals of the AND elements 26a, 26b in each of the AND element groups 26.

In this embodiment, the common input terminals 25 of the LED element groups 17 and the common output terminals 28 of the AND element groups 26 are respectively connected to each other by wires 23 using wire bonding.

Figure 6:
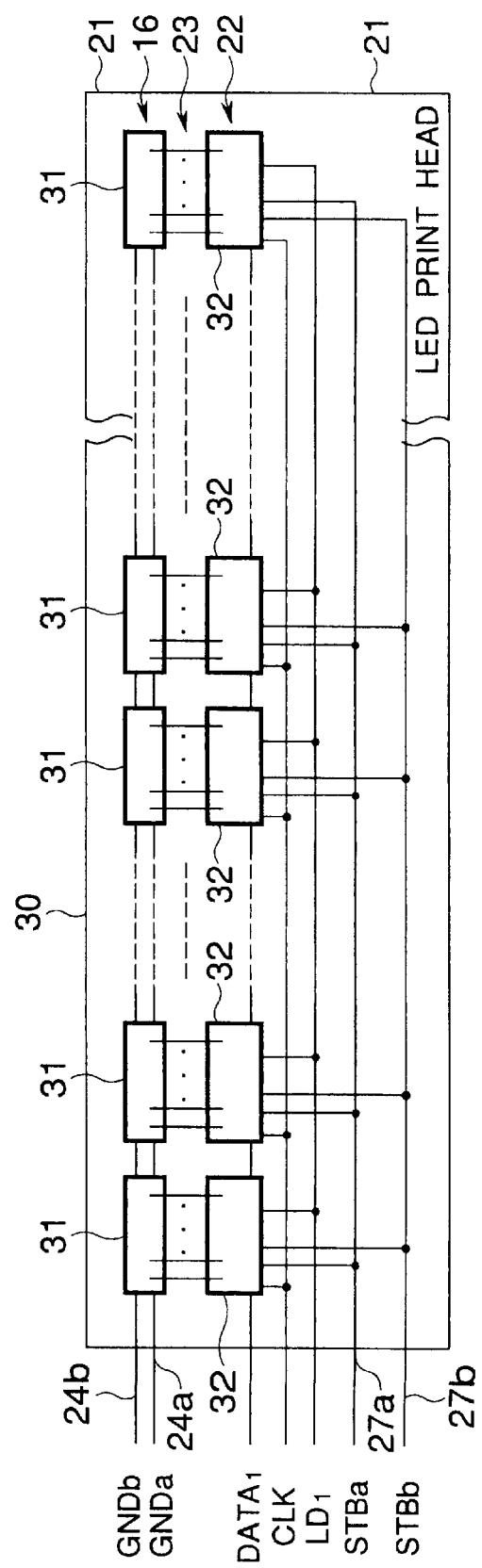
FIG. 6 is a block diagram showing a construction of the LED print head of FIG. 5.

FIG. 6 is a block diagram showing a constructional example of the LED print head of FIG. 5. As shown in FIG. 6, the LED print head 21 has plural LED array chips 31 constituting the LED array 16 and plural IC chips 32 constituting the driver IC 22 on a substrate 30 such as a printed wiring board. It should be noted that the LED array chips 31 and the IC chips 32 may be provided on separate substrates, respectively.

Figure 7:
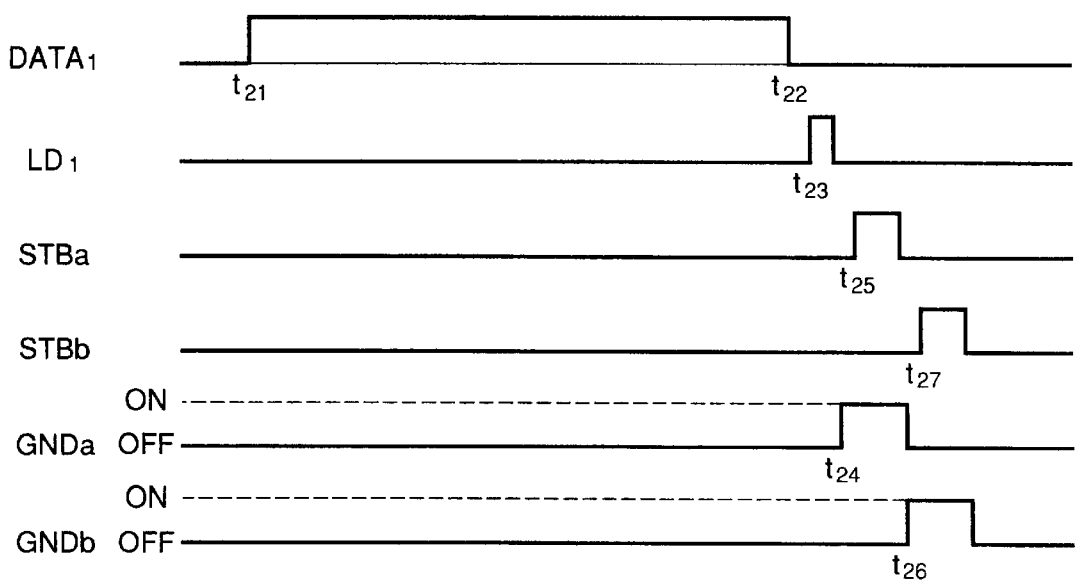
FIG. 7 is a timing chart showing signals inputted to the LED print head of FIG. 5.

FIG. 7 is a timing chart showing signals inputted to the LED print head of FIG. 5 from a print control section (not shown) including a microprocessor in a LED printer.

An operation of the LED print head 21 of this embodiment will next be explained on the basis of FIG. 7.

First, the drive data $DATA_1$ for one line of LED elements 17a, 17b are transmitted from the print control section (not shown) to the shift register 13 in synchronization with the clock signal CLK between a time $t_{21}$ to a time $t_{22}$. At a time $t_{23}$, the drive data $DATA_1$ held in the shift register 13 are transmitted to the latch circuit 14 in synchronization with a load signal $LD_1$.

At a time $t_{24}$, only the LED ground line 27a is grounded so that only the LED elements 17a are in a light emission enabling state.

At a time $t_{25}$, the strobe signal STBa transmitted to the AND elements 26a is in a turning-on state, and drive signals based on the drive data $DATA_1$ for the LED elements 26a are inputted to the common input terminals 25 of the LED element groups 17 through the common output terminals 28 and the wires 23. Although the inputted drive signals are transmitted to both the LED elements 17a and 17b, since only the LED elements 17a are in the light emission enabling state, only the odd-numbered LED elements 17a are operated.

Next, at a time $t_{26}$, only the LED ground line 27b is grounded so that only the even-numbered LED elements 17b are in a light emission enabling state.

At a time $t_{27}$, only the strobe signal STBb transmitted to the AND elements 26b is in a turning-on state so that the drive signals based on the drive data of the LED elements 26b are inputted to the common input terminals 25 of the LED element group 17 through the common output terminals 28 and the wires 23. Although the inputted drive signals are transmitted to both the LED elements 17b and 17a, since only the LED elements 17b are in the light emission enabling state, only the even-numbered LED elements 17b are operated.

Synchronism between grounding of the ground line 24a or 24b and the strobe signal STBa or STBb is possible by providing switches (not shown) through which the ground potential is applied to the LED ground line 24a or 24b, and which are operated in synchronization with the strobe signals STBa, STBb, respectively.

Figure 1:
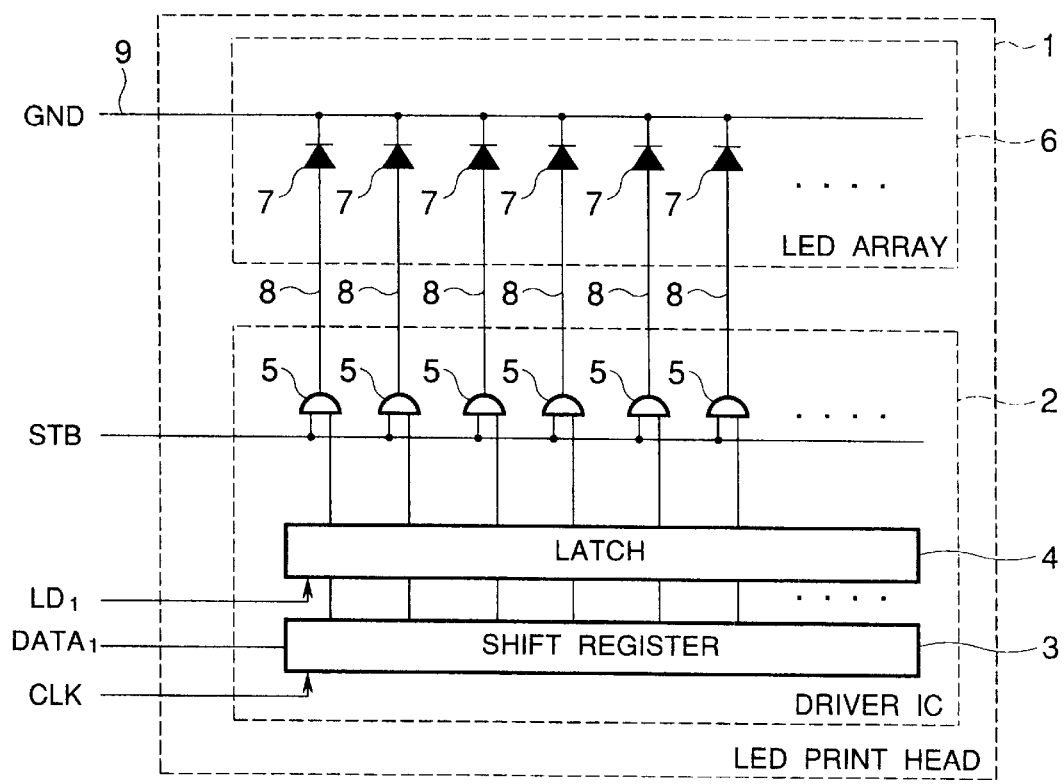
FIG. 1 is the circuit diagram showing the conventional LED print head.
Figure 2:
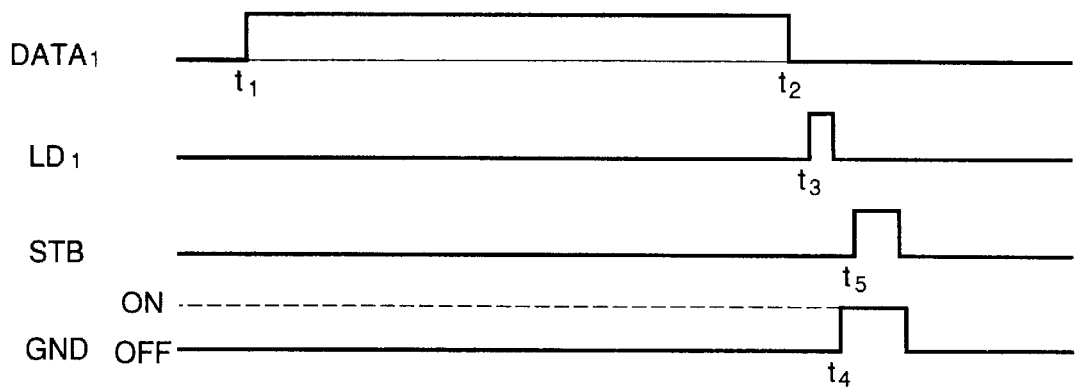
FIG. 2 is the timing chart showing the signals inputted to the LED print head of FIG. 1.
Figure 3:
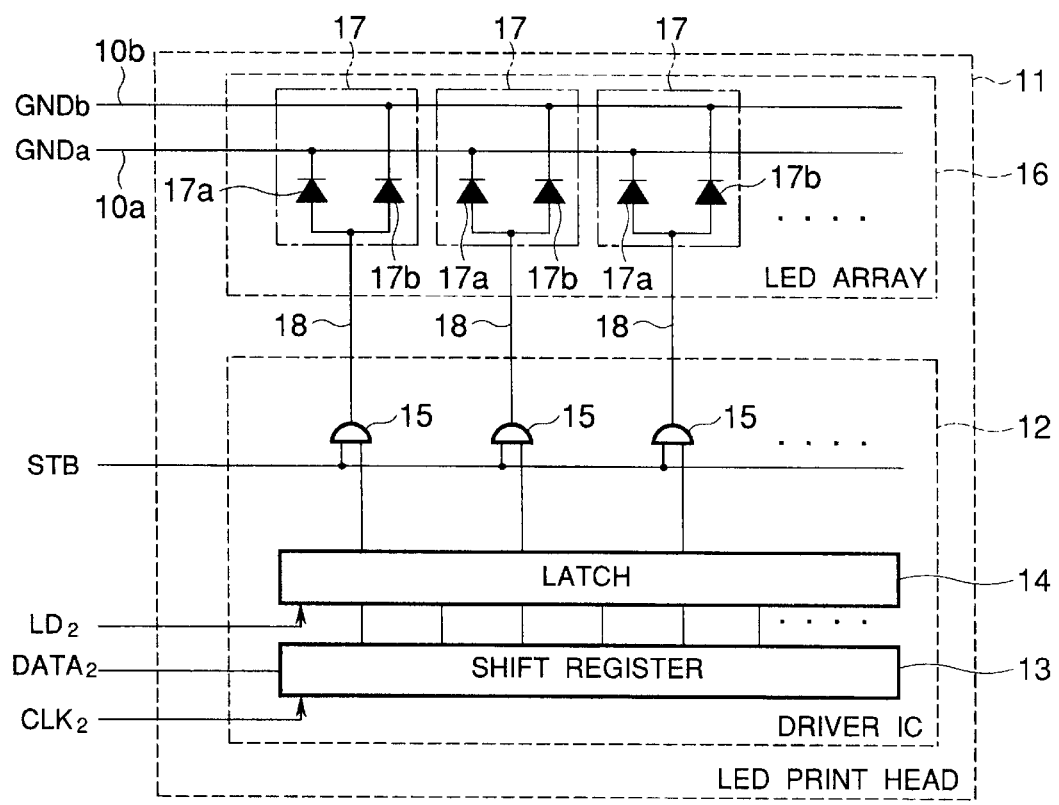
FIG. 3 is the circuit diagram showing another conventional LED print head.
Figure 4:
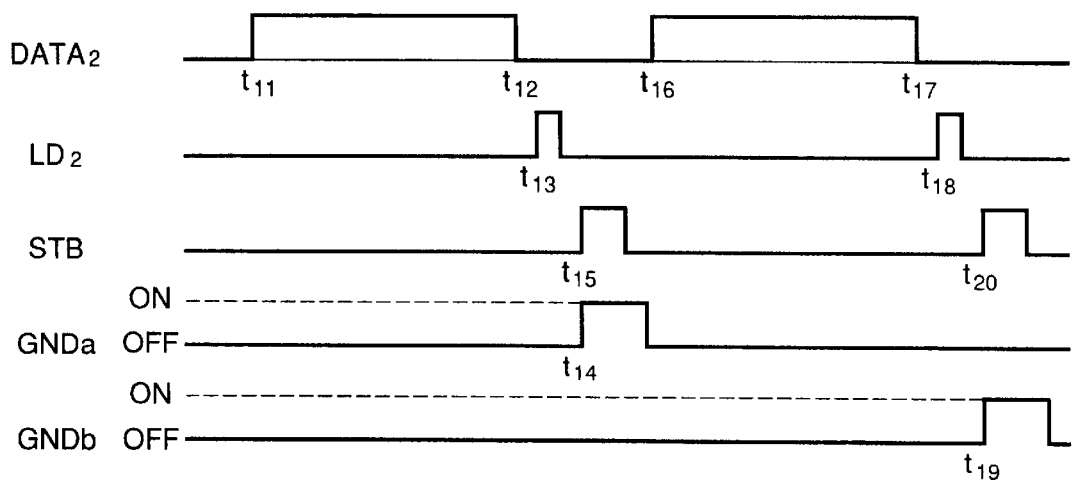
FIG. 4 is the timing chart showing the signals inputted to the LED print head of FIG. 3.

As described above, the LED print head 21 of this embodiment can receive the drive data $DATA_1$ from the print control section of the LED printer, which is not shown in the figures, in the same way as the conventional LED print head 1 of the static system shown in FIG. 1. Therefore, the LED print head 21 of this embodiment can be easily applied to the LED printer of the static system.

Further, in the LED print head 21 of this embodiment, the number of the wires 23 for connecting the LED array 16 and the driver IC 22 can be reduced by half in comparison with the conventional LED print head 1 of the static system shown in FIG. 1. Since light emission of LED elements is executed every half, a maximum value of the drop of a driving potential caused by simultaneous light emission of the LED elements can be reduced. Further, the density of the wires joined using wire bonding is reduced so that the wire bonding process becomes easy, and a fine image can be obtained using the LED print head 21 of this embodiment without relying on the difficult technique for increasing the density of wires.

In the above description, the LED element groups 17 are respectively composed of two LED elements 17a, 17b, but they may be respectively composed of three or more LED elements. Further, the driver IC groups 26 may be respectively composed of three or more IC elements. In this case, it is necessary that the strobe lines should correspond to the ground lines respectively, but the light emitting order of the LED elements in each of the LED element groups may be selected freely.

What is claimed is:

1. A driver IC for driving printing elements comprising:
   a data holding circuit for holding drive data for plural printing elements;
   driving elements for outputting drive signals based on the drive data held in the data holding circuit, the driving elements being divided into driving element groups;
   strobe lines for transmitting strobe signals to the driving elements, the strobe signals being used for transmitting to the driving elements information regarding driving order of the driving elements in each of the driving element groups, one of the driving elements in each of the driving element groups being selected by the strobe signals so that the selected driving element drives a printing element; and
   common output terminals each being formed by connecting output terminals of the driving elements in each of the driving element groups.

2. A driver IC of claim 1, wherein the printing elements are LED elements.

3. A driver IC of claim 1 wherein the driving element groups each include two driving elements.

4. An LED print head for printing comprising:
   LED elements, the LED elements being divided into LED element groups, each of which includes a predetermined number of LED elements;
   light emission enabling lines for selecting the LED elements to set light emitting order of the LED elements in each of the LED element groups;
   common input terminals each being formed by connecting together input terminals of the LED elements in each of the LED element groups;
   a data holding circuit for holding drive data for the LED elements;
   driving elements for outputting drive signals based on the drive data held in the data holding circuit, the driving elements being divided into driving element groups;
   strobe lines for transmitting strobe signals to the driving elements, the strobe signals for transmitting to the driving elements information regarding driving order of the driving elements in each of the driving element groups, one of the driving elements in each of the driving element groups being selected by the strobe signals so that the selected driving element drives an LED element;
   common output terminals each being formed by connecting output terminals of the driving elements in each of the driving element groups, the common output terminals corresponding to the common input terminals, respectively; and
   wires for connecting the common input terminals and the common output terminals, respectively.

5. An LED print head of claim 4, wherein the predetermined number of LED elements are two LED elements, and each driving element group includes two driving elements.

6. An LED print head of claim 4, wherein the light emission enabling lines select the LED elements synchronously with respect to the selection of the driving elements by the strobe signals, so that the selected driving elements drive the LED elements selected by said light emission enabling lines.

7. A driver IC of claim 1, wherein each of the driving elements groups includes a predetermined number of driving elements.

* * * * *